United States Patent [19]

Rotter

[11] Patent Number: 5,785,478
[45] Date of Patent: *Jul. 28, 1998

[54] FASTENER

[76] Inventor: Martin J. Rotter, 115 Lismore Ave., Glenside, Pa. 19038

[21] Appl. No.: 814,768

[22] Filed: Mar. 7, 1997

[*] Notice: The term of this patent shall not extend beyond the expiration date of Pat. No. 5,511,918.

Related U.S. Application Data

[63] Continuation of Ser. No. 536,873, Sep. 29, 1995, abandoned, Continuation-in-part of Ser. No. 233,564, Apr. 26, 1994, Pat. No. 5,511,918.

[51] Int. Cl.⁶ ........................................... F16B 15/00
[52] U.S. Cl. ........................... 411/487; 411/482; 411/441; 411/424
[58] Field of Search ........................... 411/490, 487, 411/497, 493, 440, 441, 411, 424, 426, 399, 387, 480, 482

[56] References Cited

U.S. PATENT DOCUMENTS

| | | | |
|---|---|---|---|
| Re. 23,786 | 2/1954 | Baisch | 411/440 |
| 451,213 | 4/1891 | Shepley | 411/482 |
| 519,411 | 5/1894 | North | |
| 1,108,209 | 8/1914 | Mitchell et al. | |
| 1,206,161 | 11/1916 | Stengel | |
| 2,048,234 | 7/1936 | Tucker | |
| 2,093,261 | 9/1937 | Willson | |
| 2,171,877 | 9/1939 | Johnson | |
| 2,307,348 | 1/1943 | Anderson | 411/487 |
| 2,557,370 | 6/1951 | Bussmann | |
| 2,724,303 | 11/1955 | Holcomb | 411/903 |
| 2,853,746 | 9/1958 | Spencer et al. | |
| 2,855,817 | 10/1958 | Kopf | |
| 3,490,329 | 1/1970 | Pratorius | 411/441 |
| 3,495,368 | 2/1970 | Krause | |
| 4,399,643 | 8/1983 | Hafner | |
| 4,697,969 | 10/1987 | Sparkes | 411/399 |
| 4,781,508 | 11/1988 | Schroeder et al. | |
| 4,823,978 | 4/1989 | Pufpaff | |
| 4,878,793 | 11/1989 | Hewison | 411/399 |
| 5,024,038 | 6/1991 | De Pellegrini et al. | |
| 5,167,579 | 12/1992 | Rotter | |
| 5,392,573 | 2/1995 | Gould | |
| 5,421,684 | 6/1995 | Kluemper | |

FOREIGN PATENT DOCUMENTS

| | | | |
|---|---|---|---|
| 0249334 | 1/1964 | Australia | |
| 1099241 | 8/1955 | France | 411/441 |
| 2303190 | 10/1976 | France | |
| 0090348 | 3/1959 | Netherlands | |

*Primary Examiner*—Flemming Saether
*Attorney, Agent, or Firm*—Panitch Schwarze Jacobs & Nadel, P.C.

[57] ABSTRACT

A fastener comprising a shaft having a preselected length for use in fastening at least two materials together. A head extends radially around the shaft at one end. The shaft is provided with an enlarged shaft portion located in proximity to the head. The enlarged shaft portion has a pair of opposite ends, a cylindrical center portion and a pair of frusto-conical tapered portions. Each of the frusto-conical tapered portions extends from the center portion to one of the ends. The enlarged shaft portion has a length less than the length of the shaft.

13 Claims, 3 Drawing Sheets

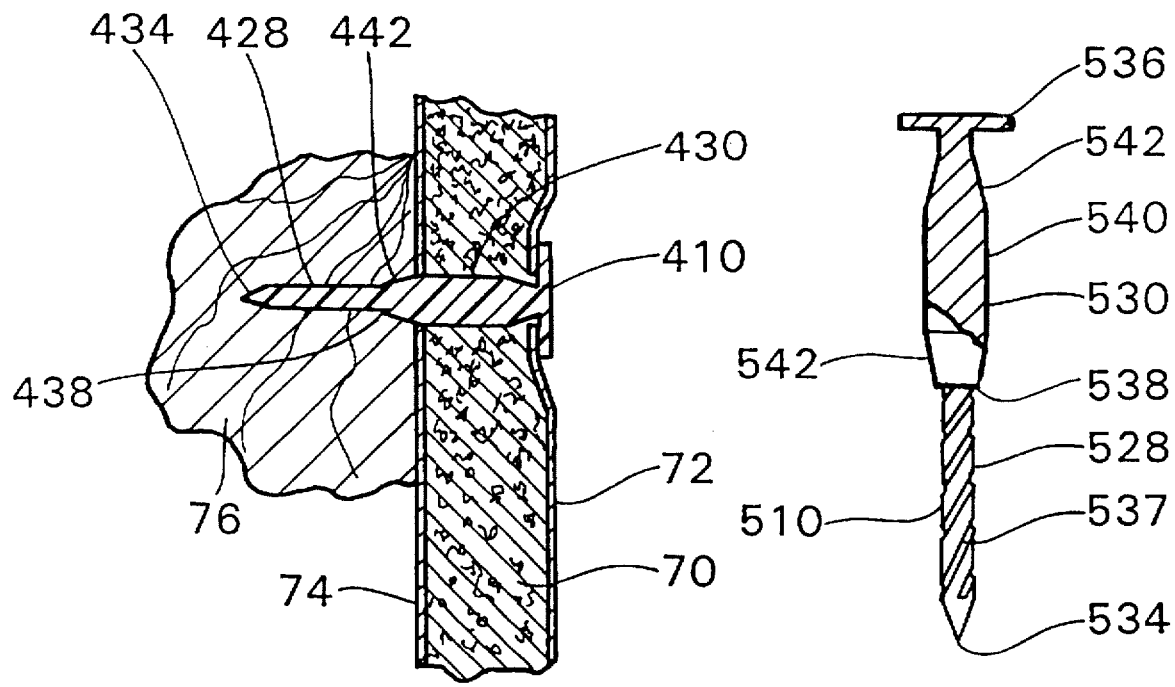
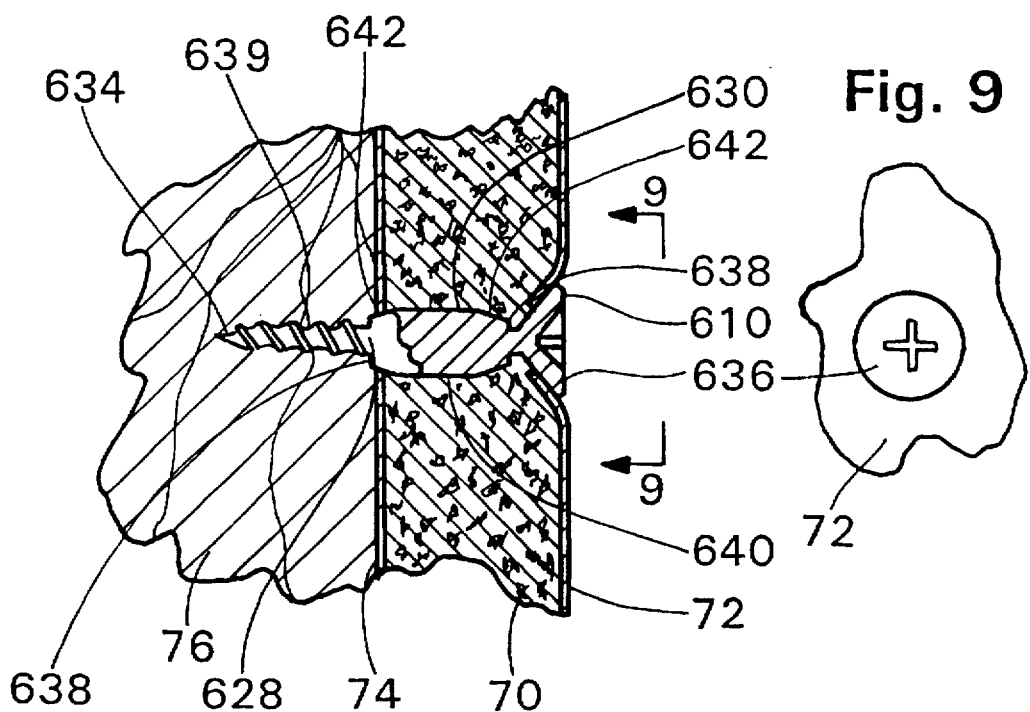

FASTENER

CROSS-REFERENCE TO RELATED APPLICATIONS

This application is a continuation of U.S. patent application Ser. No. 08/536,873, filed Sep. 29, 1995, now abandoned which is a continuation-in-part of U.S. patent application Ser. No. 08/233,564, filed on Apr. 26, 1994, now U.S. Pat. No. 5,511,918.

FIELD OF THE INVENTION

The present invention relates to a fastener for fastening two materials together and precisely controlling the fastener penetration through one or more materials.

BACKGROUND OF THE INVENTION

In building construction it is commonly necessary to affix together various sheet materials which must be properly spaced apart from each other to achieve their intended function.

For example, it is desirable to ventilate an attic to equalize the attic temperature and pressure with that outside the building. This equalization inhibits moisture 20 from condensing on insulation and wood roof materials, prevents build-up of ice dams, and reduces air-conditioning costs. One ventilating system is a roof ridge vent using a synthetic fiber matting, covered by asphalt cap shingles and fastened to the plywood roof sheathing, as disclosed in U.S. Pat. No. 5,167,579. The overlying cap shingles are secured to the sheathing by nails passing through the matting, and a nail should only be driven to a depth where the shingle remains spaced apart from the sheathing sufficiently to prevent the shingle from being dimpled around the nail site and the resilient material from being too greatly compressed.

Another example includes placing a layer of foam insulation between vinyl or aluminum siding panels and the outer wall sheathing. Nails are received in slots in the siding panels and extend through the insulation material into an underlying sheathing. Similar to the roof venting system, the siding panels must be secured a distance apart from the sheathing to prevent the siding panels from dimpling and the insulation material from being crushed. This is also true in applications where siding panels are installed without a layer of insulation between the siding panel and the outer sheathing.

Another example includes nails used to hold insulation material in position on any type of backing material. The nails or staples which are typically used generally crush the insulation if driven in all the way, and nothing is provided to ensure that the insulation is not crushed, which reduces the R value.

Nails have previously been developed for installing sheets of drywall to properly space the head of the nail from the stud surface underlying the drywall. These nails have a fluted shank which ensures that the head of the nail does not penetrate too deeply into the drywall. The flute crushes through the drywall until it engages the stud, thus ensuring that the head of the nail does not penetrate too deeply into the drywall. U.S. Pat. No. 4,781,508 discloses such a fluted nail.

However, fluted nails-of that type are not capable of cutting through resilient materials such as the synthetic fiber matting or the insulation described above, and would instead compress or crush the resilient matting or foam material. Furthermore, such nails are not designed to seal over the hole created by the passage of the fluted shank to prevent moisture penetration, nor would they allow the slotted siding panels to slide laterally along the nail.

The present inventor has provided a nail with a sleeve carried by the shaft, with the sleeve having a cylindrical center portion and two frusto-conical tapered portions extending from the centered portion. The nail is disclosed particularly for roofing and siding applications and the sleeve controls the depth of penetration of the nail. The benefits and uses of this nail are described in parent application Ser. No. 08/233,564, filed on Apr. 26, 1994, which is incorporated herein by reference as if fully set forth.

SUMMERY OF THE INVENTION

The present invention provides a fastener, comprising a shaft having a preselected length. A head extends radially around the shaft at one end. The shaft is provided with an enlarged shaft portion located in proximity to the head. The enlarged shaft portion has a pair of opposite ends, a cylindrical center portion and a pair of frusto-conical tapered portions. Each of the frusto-conical tapered portions extends from the center portion to one of the ends. The enlarged shaft portion has a length less than the length of the shaft.

Further features and advantages of the present invention will become more apparent to those skilled in the art as the nature of the invention is better understood from the accompanying drawings and detailed description.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 6 is a sectional view of an alternate embodiment of a nail according to the present invention for use with gypsum board;

FIG. 7 is a sectional view of another embodiment of a nail in accordance with the present invention.

FIG. 8 is a sectional view of an embodiment of a screw in accordance with the present invention for use with gypsum board;

FIG. 9 is a front view taken along line 9—9 in FIG. 8.

DESCRIPTION OF THE PREFERRED EMBODIMENTS

Figure 1:
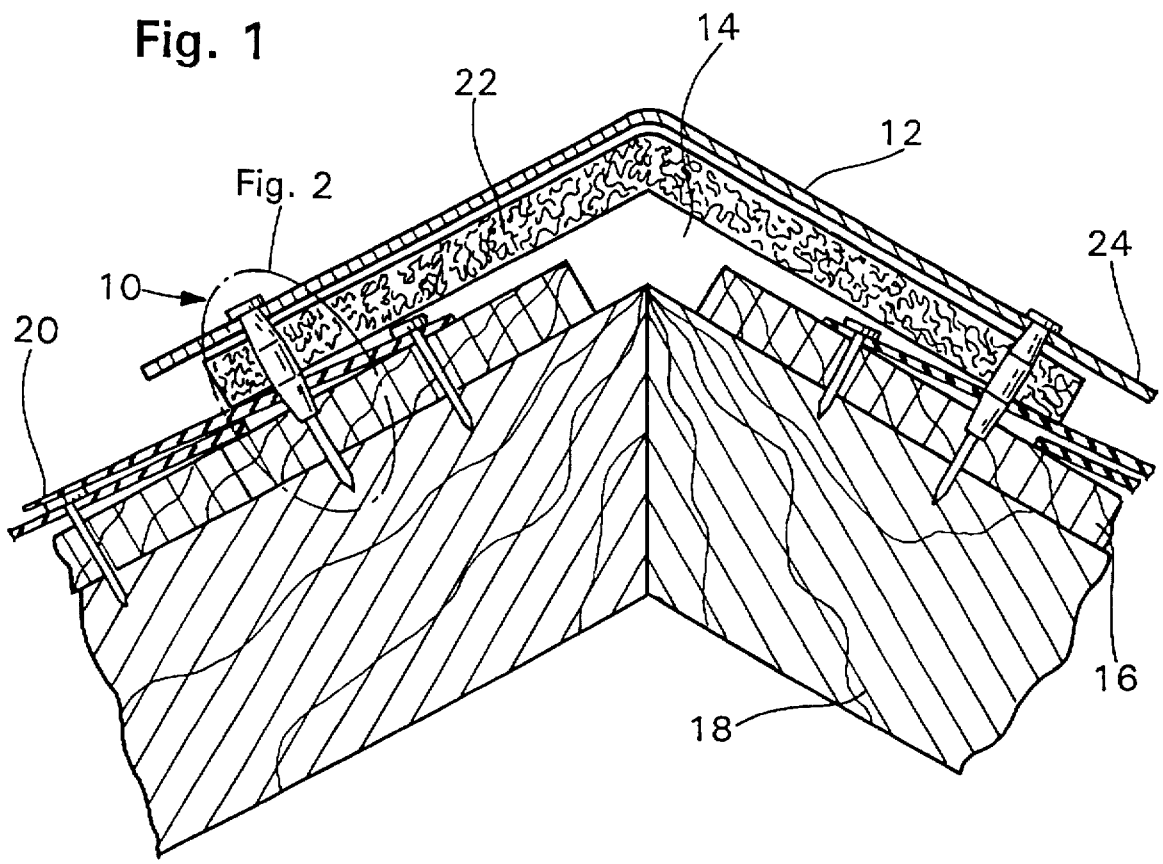
FIG. 1 is a side sectional view of the layers of a built-up roof showing one embodiment of a nail according to the invention.

Referring to the drawings in detail, wherein like numerals indicate like elements, FIG. 1 illustrates a fastener in the form of a nail 10 according one embodiment of the invention. Alternative embodiments are later described to highlight other novel features of the fastener.

Referring to FIG. 1, a venting system 12 is used to vent hot air from an attic through an open slot 14 in the ridge of a roof. The slot 14 is formed by cutting a sheeting material, such as an upper row sheathing panel 16, approximately ¾" short of the ridge crest formed by the rafters 18 in a roof truss, as shown.

Roof shingles 20 are laid in overlapping rows in the conventional manner up to the slot 14. A unitary mat 22 is made of randomly-aligned synthetic fibers joined by phenolic or latex bonding which is heat cured to provide the mat 22 with varying mesh. The materials of the mat 22 are described in more detail in U.S. Pat. No. 5,167,579 which is incorporated herein by reference, and such mat is commercially available under the name COBRA© Ridge Vent sold by GAF Materials Corporation. The mat 22 is a continuous strip preferably about 10½" wide and ¾" thick. It runs the length of the slot 14 extending evenly on each side, and is of such low profile that it does not attract attention when covered by shingles of the same color and texture as used on the rest of the roof, such as a cap shingle 24.

The mat 22 may easily be laid by unwinding one end of the material from a roll starting over the slot 14 at one end, then unrolling it in a continuous strip to the other end where it is cut from the roll. Starting from one end and working to the other, each cap shingle 24 is then laid over the mat 22 and overlaps the edge of the preceding cap shingle 24, and is secured by driving a fastener in the form of a nail 10 of the invention through the cap shingle 24, mat 22 and the roof shingle 20 into the underlying sheathing 16 and rafters 18.

Figure 2:
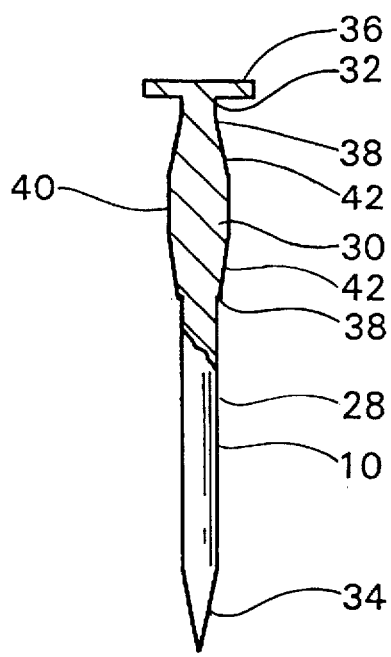
FIG. 2 is an enlarged sectional view of the nail shown in FIG. 1.

Referring to FIG. 2, the nail 10 comprises a shaft 28 having a preselected length and two ends. A head 36 extends radially around the shaft 28 at one end. An enlarged shaft portion 30 is located in proximity to the head 36. The enlarged shaft portion 30 has a pair of opposite ends 38, a cylindrical center portion 40 and a pair of frusto-conical tapered portions 42. Each of the frusto-conical tapered portions 42 extends from the center portion 40 to one of the ends 38. The lower frusto-conical portion 42 tapers down at the end 38 of the sleeve 30 toward the end 34 to form a cutting or knife edge. The upper frusto-conical portion 42, in proximity to the head 36 of the nail 10, allows the resilient materials such as the fibers in mat 22 to close up. Any compression of the mat 22 during driving of the nail 10 will dissipate shortly. Furthermore, the cap shingle 24 of the first embodiment melts slightly and conforms to the shape of the shaft 32 above the frusto-conical portion 42 creating a seal. The enlarged shaft portion 30 has a length less than the length of the shaft 28.

Preferably, for roofing applications, the nail 10 with the enlarged shaft portion 30 is made of zinc, iron or steel and may be hot-dip galvanized or may be made of stainless steel. However, for other applications the nail 10 may be made of a plastic material such as polyvinyl chloride, polypropylene, a reinforced composite, such as KEVLAR® in an epoxy matrix, or other suitable materials depending upon the particular application.

Preferably, for roofing applications with a ridge vent, for a mat 22 of ¾ inch thickness, the nail 10 is approximately 2 ½ inches long. The enlarged shaft portion 30 is one inch long with the cylindrical center portion being ¼ inch long and each frusto-conical portion being ⅜ inch long. The shaft has a nominal diameter of 0.136 inches and the enlarged shaft portion has a nominal diameter of 0.188 inches (³⁄₁₆"). The frusto-conical portion tapers down to 0.172 inches (¹¹⁄₆₄"), defining a shoulder height of approximately 0.018 inches to form the cutting edge 38.

Figure 3:
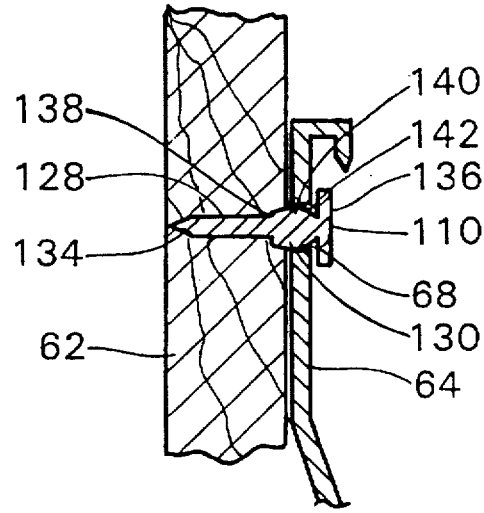
FIG. 3 is a sectional view of an alternate embodiment of the nail according to the invention for use with siding.

Referring to FIG. 3, an alternate fastener in the form of a nail 110 in accordance with the present invention is shown for attaching the siding 64 to the sheathing 62. The nail 110 is similar to the nail 10 and like elements have been designated with like numbers including the prefix "1". For example, the enlarged shaft portion 130 is similar to the enlarged shaft portion 30. Accordingly, reference numerals have been provided on the drawing figure for convenience only, and a description of the differences from the first embodiment 10 follows.

In the second embodiment of the nail 110, the enlarged shaft portion 130 has been shortened to the proper length for securing the siding 64 directly to the sheathing 62. The upper frusto-conical portion 142 of the enlarged shaft portion 130, is smaller than the cylindrical portion 140 of the enlarged shaft portion 130 and the minor axis of slot 68, allowing the siding 64 to move laterally relative to the nail 110 upon expansion and contraction of the siding 64.

Figure 4:
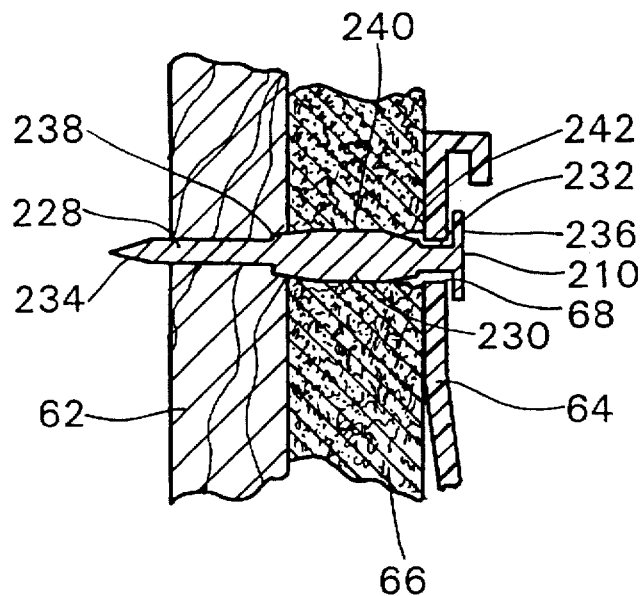
FIG. 4 is a sectional view of an alternate embodiment of a nail according to the invention for use with insulation and siding.

Referring now to FIG. 4, an alternate fastener in the form of a nail 210 in accordance with the present invention is shown. The nail 210 is similar to the nail 10 as described above, and like elements have been designated with like numbers including the prefix "2". Reference numerals have been provided on the drawing figure for convenience only, and a description of the differences from the first embodiment 10 follows.

The enlarged shaft portion 230 has the proper length for securing the insulation 66 and the siding 64 directly to the sheathing 62. The upper frusto-conical portion 242 of the enlarged shaft portion 130, is spaced from the head 236 such that an upper portion 232 of the shaft 228 is located in the minor axis of slot 68, allowing the siding 64 to move laterally relative to the nail 210 upon expansion and contraction of the siding 64. The frusto-conical portion 242 toward the end 234 includes a cutting or knife edge 238 which cuts through resilient insulation material.

Figure 5:
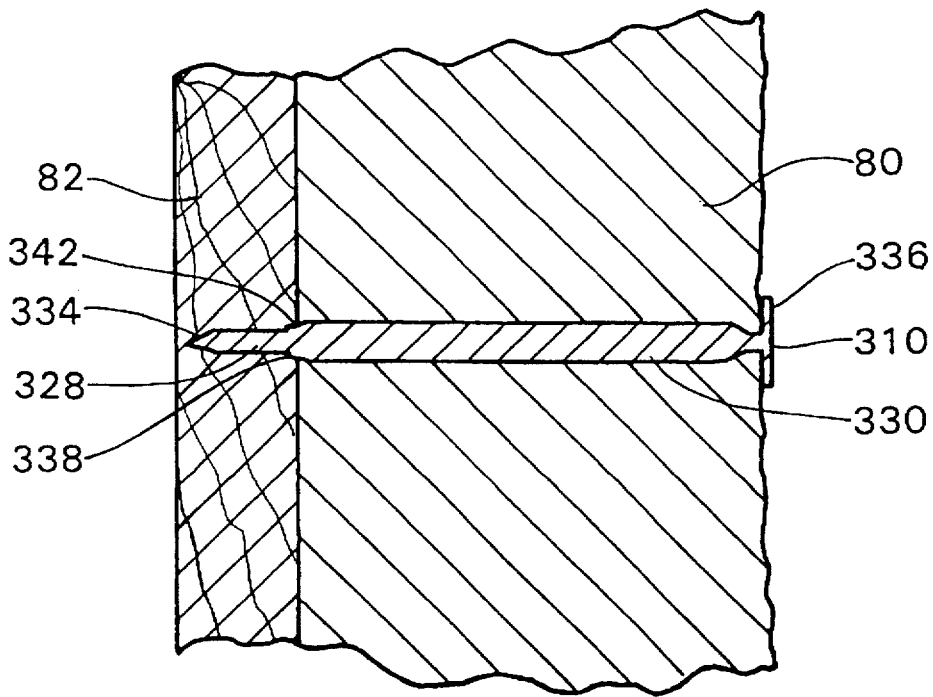
FIG. 5 is a sectional view of an alternate embodiment of a nail according to the invention for use with insulation.

Referring to FIG. 5, an alternate fastener in the form of a nail 310 in accordance with the present invention is shown. The nail 310 is similar to the nail 10 as described above, and like elements have been designated with like numbers including the prefix "3". Reference numerals have been provided on the drawing figure for convenience only, and a description of the differences from the first embodiment 10 follows.

The nail 310 includes an enlarged shaft portion 330, and is designed to have the proper length for securing insulation 80 to interior or exterior sheathing 82. The frusto-conical portion 342 tapers down at the end of the enlarged shaft portion 330 toward the end 334 to form a cutting or knife edge 338. The cutting edge 338 cuts the insulation material 80 as the nail 310 is driven. Any compression of the insulation material 80 during driving of the nail 10 will dissipate and the insulation material 80 will re-expand to the height of the head 336. The cutting edge 338 engages and penetrates slightly into the sheathing 80. The hardness of the sheathing 80 and the taper of the frusto-conical portion 342 limits the depth the enlarged shaft portion 330 enters the sheathing 80, preventing over driving of the nail 310 and the undesirable compression of the insulation material 80.

Referring to FIG. 6, an alternate fastener in the form of a nail 410 in accordance with the present invention is shown. The nail 410 is similar to the nail 10 as described above, and like elements have been designated with like numbers including the prefix "4". Reference numerals have been provided on the drawing figure for convenience only, and a description of the differences from the first embodiment 10 follows.

The nail 410 includes an enlarged shaft portion 530, and is designed to have the proper length for securing gypsum board 70 having a face sheet 72 and a back sheet 74 to interior framing elements 76. The length of the enlarged shaft portion 430 is set at a predetermined length such that the head 436 is seated at the proper depth below the surface of the face sheet 72 of the gypsum board 70, and the head 436 has not ripped through the face sheet 72 around the periphery of the head 436. The frusto-conical portion 442 tapers down at the end of the enlarged shaft portion 430 toward the end 434 to form a cutting or knife edge 438, which cuts through the face sheet 72 as the nail 410 is driven in.

Referring to FIG. 7, an alternate fastener in the form of a nail 510 in accordance with the present invention is shown. The nail 510 is similar to the nail 10 as described above, and like elements have been designated with like numbers including the prefix "5". Accordingly, only the differences from the nail 10 will be described in detail, and reference numerals have been provided in the figure for convenience only.

The nail 510 includes a shaft portion 530 with spiral flutes 537. The spiral flutes 537 cause the nail to spin as it is driven into the materials being fastened, enhancing the cutting action of the cutting edge located on the end 538 of the frusto-conical tapered portion 542 which extends toward the pointed end 534. The spiral flutes 537 also provide enhanced gripping to retain the nail 510 in the materials being fastened.

The above embodiments of the nail 110, 210, 310, 410 and 510 are preferably one piece and made of zinc, iron or steel and may be hot-dip galvanized or may be made of stainless steel. For other applications the nail 110, 210, 310, 410 or 510 may be made of a plastic material such as polyvinyl chloride, polypropylene, a reinforced composite, such as KEVLAR® in an epoxy matrix, or other suitable materials depending upon the particular application. However, those skilled in the art will recognize that the nails 110, 210, 310, 410 and 510 are not limited to the materials specifically disclosed above, and may be made of any suitable material, depending on the particular application.

It will also be recognized by those of ordinary skill in the art from the present application that the nails 110, 210, 310, 410 and 510 can be strung together for use with nail guns. For example, metallic nails x10 (where "x" designates any of the above-referenced prefix numbers 1–5) can be connected to two parallel wires (not shown), spaced apart along the respective shaft portions x28 such that the nails x10 can be coiled for use with a coil-feed nail gun. The nail heads x36 may be notched such that the cylindrical portions x40 of the enlarged shaft portions x30 are adjacent to each other. Alternatively, a plastic retainer ribbon, of the type generally known to those of ordinary skill in the art, can be used to string metallic or non-metallic nails x10 together for use with a nail gun.

Referring now to FIGS. 8 and 9, an alternate fastener in the form of a screw 610 is shown. The screw 610 has a shaft 628 that includes a head 636 radially extending around the shaft 628 at a first end and is pointed at the second end 634. The head 636 includes a recess 637 adapted to receive a driving tool. Preferably, the recess 637 is a cross recess of the type known to those of ordinary skill in the art. However, it will be understood by the ordinarily skilled artisan that the recess could be a single slot or a six-sided recess adapted to receive an allen key, or any other suitable shape.

The screw 610 further comprises threads 639 located on the shaft 628. The threads 639 are of the type generally known to those of ordinary skill in the art and are preferably conventional wood screw threads. However, those of ordinary skill in the art will understand from the present disclosure that other thread forms may be used.

An enlarged shaft portion 630 is located in proximity to the head 636. The enlarged shaft portion 630 includes a pair of opposite ends 638, a cylindrical center portion 640 and a pair of frusto-conical tapered portions 642. Each of the frusto-conical tapered portions 642 extends from the center portion 640 to one of the ends 638. The frusto-conical tapered portion 642 extending toward the second end 634 forms a cutting edge. The enlarged shaft portion 630 has a length less than the overall length of the shaft 628.

The screw 610 is designed to have the proper length for securing gypsum board 70 having a face sheet 72 and a back sheet 74 to interior framing elements 76. The length of the enlarged shaft portion 630 is set at a predetermined length such that the head 636 is seated at the proper depth below the surface of the face sheet 72 of the gypsum board 70, and the head 636 has not ripped through the face sheet 72 around the periphery of the head 636. The frusto-conical portion 642 tapers down at the end of the enlarged shaft portion 630 toward the end 634 to form a cutting or knife edge 638, which cuts through the face sheet 72 as the screw 610 is turned in.

The screw 610 is preferably one piece and made of zinc, iron or steel and may be hot-dip galvanized or may be made of stainless steel. For other applications the screw 610 may be made of a plastic material such as polyvinyl chloride, polypropylene, a reinforced composite, such as KEVLAR® in an epoxy matrix, or other suitable materials depending upon the particular application. However, those skilled in the art will recognize that the screw 610 is not limited to the materials or form specifically disclosed above, and may be made of any suitable material, depending on the particular application.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A fastener comprising:
    a shaft having a preselected length,
    a head extending radially around the shaft at one end; and
    an enlarged shaft portion to control penetration depth located in proximity to the head formed as a single piece with the shaft, the enlarged shaft portion having a pair of opposite ends, a center portion and a frusto-conical tapered portion extending from the center portion toward the end of the enlarged shaft portion opposite to the head which terminates in a shoulder having a larger diameter than the shaft, the enlarged shaft portion having a length less than the length of the shaft.

2. The fastener of claim 1 further comprising threads located on the shaft.

3. The fastener of claim 2 wherein the head includes a recess adapted to receive a driving tool.

4. The fastener of claim 1 wherein the fastener is made of a plastic material.

5. The fastener of claim 1 wherein the shaft includes spiral flutes.

6. The fastener of claim 1 wherein the head is spaced from the enlarged shaft portion by a predetermined distance.

7. The fastener of claim 1 wherein the fastener is a nail.

8. A fastener for securing at least two materials together, the fastener comprising:

a shaft of preselected length having a first end and a second end;

a head extending radially around the shaft at the first end;

an enlarged shaft portion for controlling penetration depth located in proximity to the head formed as a single piece with the shaft, the enlarged shaft portion having a pair of opposite ends, a center portion and a frusto-conical tapered portion, the frusto-conical tapered portion extending from the center portion to the end of the enlarged shaft portion opposite to the head, the frusto-conical tapered portion including a cutting edge circumferentially extending around the shaft, the enlarged shaft portion having a length less than the length of the shaft.

9. The fastener of claim 8 further comprising threads located on the shaft.

10. The fastener of claim 9 wherein the head includes a recess adapted to receive a driving tool.

11. The fastener of claim 8 wherein the fastener is made of a plastic material.

12. The fastener of claim 8 wherein the shaft includes spiral flutes.

13. The fastener of claim 8 wherein the head is spaced from the enlarged shaft portion by a predetermined distance.

* * * * *